(12) United States Patent
Oidemizu et al.

(10) Patent No.: US 12,125,292 B2
(45) Date of Patent: Oct. 22, 2024

(54) INFORMATION PROCESSING DEVICE, INFORMATION PROCESSING SYSTEM, INFORMATION PROCESSING METHOD, AND TERMINAL DEVICE

(71) Applicant: TOYOTA JIDOSHA KABUSHIKI KAISHA, Toyota (JP)

(72) Inventors: Takayuki Oidemizu, Nagakute (JP); Yui Ogura, Nagoya (JP); Shingo Taguchi, Nagoya (JP); Yoh Ikeda, Konan (JP); Tatsuya Suzuki, Nagoya (JP); Tsunehiro Yokomori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 418 days.

(21) Appl. No.: 17/590,581

(22) Filed: Feb. 1, 2022

(65) Prior Publication Data
US 2022/0327841 A1 Oct. 13, 2022

(30) Foreign Application Priority Data

Apr. 7, 2021 (JP) ................. 2021-065507

(51) Int. Cl.
| | |
|---|---|
| G06V 20/58 | (2022.01) |
| B60W 50/14 | (2020.01) |
| G01C 21/34 | (2006.01) |
| G01C 21/36 | (2006.01) |

(52) U.S. Cl.
CPC ............ *G06V 20/58* (2022.01); *B60W 50/14* (2013.01); *G01C 21/3438* (2013.01); *G01C 21/362* (2013.01); *B60W 2050/146* (2013.01); *B60W 2420/403* (2013.01); *B60W 2554/4029* (2020.02); *B60W 2554/4041* (2020.02)

(58) Field of Classification Search
None
See application file for complete search history.

(56) References Cited

U.S. PATENT DOCUMENTS

| | | | | |
|---|---|---|---|---|
| 10,504,371 | B2 * | 12/2019 | Hori | ........................ G08G 1/166 |
| 2017/0351335 | A1 * | 12/2017 | Kim | ........................ G06V 40/28 |
| 2023/0230053 | A1 | 7/2023 | Sueyoshi et al. | |
| 2023/0351762 | A1 * | 11/2023 | Kushibiki | ................ G07C 5/02 |

FOREIGN PATENT DOCUMENTS

| | | |
|---|---|---|
| JP | 2002-032897 A | 1/2002 |
| JP | 2017-120238 A | 7/2017 |
| JP | 2019-105581 A | 6/2019 |
| JP | 2019-121049 A | 7/2019 |
| JP | 2019-204529 A | 11/2019 |

* cited by examiner

*Primary Examiner* — Dov Popovici

(74) *Attorney, Agent, or Firm* — Oliff PLC

(57) ABSTRACT

A server includes: an interface that acquires a vehicle-mounted camera image from a vehicle traveling toward a target specified by a user; and a control unit that detects the target based on the vehicle-mounted camera image, generates recognition information that makes the target recognizable as an image or visually recognizable based on a detection result of the target, and outputs the recognition information to the vehicle.

21 Claims, 3 Drawing Sheets

INFORMATION PROCESSING DEVICE, INFORMATION PROCESSING SYSTEM, INFORMATION PROCESSING METHOD, AND TERMINAL DEVICE

CROSS-REFERENCE TO RELATED APPLICATION

This application claims priority to Japanese Patent Application No. 2021-065507 filed on Apr. 7, 2021, incorporated herein by reference in its entirety.

BACKGROUND

1. Technical Field

The present disclosure relates to an information processing device, an information processing system, an information processing method, and a terminal device.

2. Description of Related Art

Conventionally, there is known a system in which a user requesting a taxi dispatch displays a captured image of the surroundings on a terminal of the dispatched taxi (see, for example, Japanese Unexamined Patent Application Publication No. 2002-32897 (JP 2002-32897 A)).

SUMMARY

The user is not shown in the image of the surroundings captured by the user. It is required that the vehicle can easily reach a target such as the user.

An object of the present disclosure made in view of such circumstances is to facilitate the vehicle to reach the target.

An information processing device according to an embodiment of the present disclosure includes an interface and a control unit. The interface acquires a vehicle-mounted camera image from a vehicle traveling toward a target designated by a user. The control unit detects the target based on the vehicle-mounted camera image, and generates recognition information that makes the target recognizable as an image or visually recognizable based on a detection result of the target. The control unit outputs the recognition information to the vehicle.

An information processing system according to an embodiment of the present disclosure includes the information processing device, a terminal device possessed by the user, and the vehicle.

An information processing method according to an embodiment of the present disclosure includes acquiring a vehicle-mounted camera image from a vehicle traveling toward a target designated by a user. The information processing method includes detecting the target based on the vehicle-mounted camera image based on the image specification information. The information processing method includes generating recognition information that makes the target recognizable as an image or visually recognizable based on a detection result of the target. The information processing method includes outputting the recognition information to the vehicle.

A terminal device according to an embodiment of the present disclosure is possessed by a user. The terminal device includes a terminal communication unit that acquires a vehicle-mounted camera image captured by a vehicle traveling toward a target, a display unit that displays the vehicle-mounted camera image, an input unit that receives an input from the user, and a terminal control unit. The input unit receives an input for specifying the target in the vehicle-mounted camera image by the user. The terminal control unit generates image specification information for specifying the target in the vehicle-mounted camera image, based on the input for specifying the target. The terminal control unit outputs the image specification information from the terminal communication unit to an information processing device. The information processing device detects the target from the vehicle-mounted camera image to generate recognition information that makes the target recognizable as an image or visually recognizable, and outputs the recognition information to the vehicle.

With the information processing device, the information processing system, the information processing method, and the terminal device according to the embodiment of the present disclosure, the vehicle can easily reach the target.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration Example of Information Processing System 1

Figure 1:
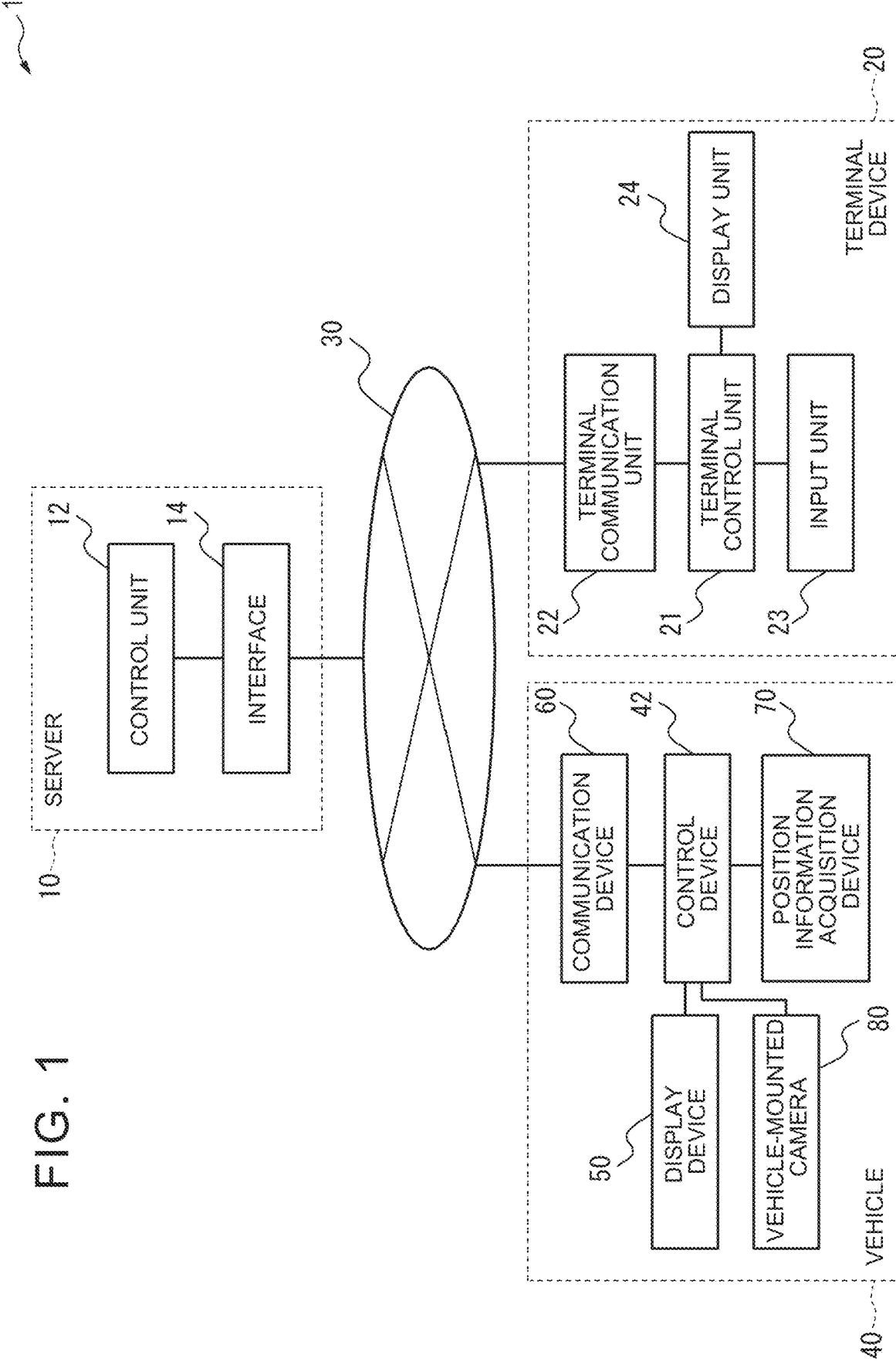
FIG. 1 is a block diagram showing a configuration example of an information processing system according to an embodiment.

As shown in FIG. 1, an information processing system 1 according to an embodiment includes a server 10, a terminal device 20, and a vehicle 40. The terminal device 20 is possessed by a user.

The information processing system 1 receives, by the terminal device 20, an input from the user for designating a target toward which the vehicle 40 is caused to travel. The information processing system 1 causes the vehicle 40 to travel toward the target designated by the user. The vehicle 40 captures an image of the surroundings of the vehicle 40 with a vehicle-mounted camera 80 and outputs the image as a vehicle-mounted camera image. The information processing system 1 generates information for the vehicle 40 to easily approach the target based on the vehicle-mounted camera image, and outputs the information to the vehicle 40. The vehicle 40 can easily approach the target by traveling based on the information generated by the information processing system 1. Hereinafter, each configuration of the information processing system 1 will be described.

Server 10

The server 10 includes a control unit 12 and an interface 14.

The control unit 12 controls each component of the server 10. The control unit 12 may be configured to include one or more processors. According to the embodiment, the "processor" is a general-purpose processor or a dedicated processor specialized for specific processing. However, the processor is not limited thereto. The control unit 12 may be configured to include one or more dedicated circuits. The dedicated circuit may include, for example, a field-programmable gate array (FPGA) or an application-specific integrated circuit (ASIC). The control unit 12 may be configured to include the dedicated circuit instead of the processor, or may be configured to include the dedicated circuit together with the processor.

The server 10 may further include a storage unit. The storage unit is, for example, a semiconductor memory, a magnetic memory, or an optical memory. However, the storage unit is not limited to these memories. The storage unit may function as, for example, a main storage device, an auxiliary storage device, or a cache memory. The storage unit may include an electromagnetic storage medium such as a magnetic disk. The storage unit may include a non-transitory computer-readable medium. The storage unit stores any information used for the operation of the server 10. The storage unit may store, for example, a system program, an application program, or the like. The storage unit may be included in the control unit 12.

The interface 14 outputs information, data, or the like from the control unit 12 to the network 30, and inputs information, data, or the like from the network 30 to the control unit 12. The interface 14 is also abbreviated as I/F.

The interface 14 may include a communication module configured to be able to communicate, via the network 30, with other devices such as devices mounted on the terminal device 20 or the vehicle 40. For example, the communication module may conform to mobile communication standards such as the fourth generation (4G) and the fifth generation (5G). The communication module may conform to communication standards such as local area network (LAN). The communication module may conform to a wired or wireless communication standard. The communication module is not limited to this and may conform to various communications standards. The interface 14 may be configured to be connectable to a communication module. The network 30 may be wired or wireless. The network 30 may be configured in various modes such as the Internet or an intranet.

The server 10 may include one server device or a plurality of server devices that can communicate with each other. The server 10 is also referred to as an information processing device.

Terminal Device 20

As shown in FIG. 1, the terminal device 20 includes a terminal control unit 21, a terminal communication unit 22, an input unit 23, and a display unit 24.

The terminal control unit 21 controls each component of the terminal device 20. The terminal control unit 21 may be configured to be the same as or similar to the control unit 12 of the server 10. The terminal control unit 21 may be configured to include one or more processors. The terminal control unit 21 may be configured to include one or more dedicated circuits. The dedicated circuit may include, for example, an FPGA or an ASIC. The terminal control unit 21 may be configured to include the dedicated circuit instead of the processor, or may be configured to include the dedicated circuit together with the processor.

The terminal device 20 may further include a storage unit. The storage unit of the terminal device 20 may be configured to be the same as or similar to the storage unit of the server 10. The storage unit is, for example, a semiconductor memory, a magnetic memory, or an optical memory. However, the storage unit is not limited to these memories. The storage unit may function as, for example, a main storage device, an auxiliary storage device, or a cache memory. The storage unit may include an electromagnetic storage medium such as a magnetic disk. The storage unit stores any information that is used for the operation of the terminal device 20. The storage unit may store, for example, a system program, an application program, or the like. The storage unit may be included in the terminal control unit 21.

The terminal communication unit 22 transmits to the server 10 information, data, or the like output from the terminal control unit 21. The terminal communication unit 22 may include a communication module configured to be communicable with other devices such as the server 10 via the network 30. The communication module may include a communication module conforming to mobile communication standards such as the 4G or the 5G. However, the communication module is not limited thereto.

The input unit 23 may be configured to include an input device that receives an input of information, data, or the like from the user. The input device may be configured to include, for example, a touch panel or a touch sensor, or a pointing device such as a mouse. The input device may be configured to include a physical key. The input device may be configured to include a voice input device such as a microphone.

The display unit 24 may include, for example, a display device that outputs visual information such as images, characters, or figures. The display device may be configured to include, for example, a liquid crystal display (LCD), an organic electro-luminescence (EL) display or an inorganic EL display, a plasma display panel (PDP), or the like. The display device is not limited to the displays above, and may be configured to include various other types of displays. The display device may be configured to include a light emitting device such as a light emission diode (LED) or a laser diode (LD). The display device may be configured to include various other devices.

The terminal device 20 may further include a position information acquisition unit that acquires the position information of the terminal device 20 itself. The position information acquisition unit may be configured to be the same as or similar to a position information acquisition device 70 described later.

The number of terminal devices 20 included in the information processing system 1 is not limited to one, and may be two or more. The terminal device 20 may be configured to include a mobile terminal such as a smartphone or a tablet, or a personal computer (PC) such as a laptop PC or a tablet PC. The terminal device 20 is not limited to the examples above, and may be configured to include various devices.

Vehicle 40

The vehicle 40 is equipped with a control device 42, a display device 50, a communication device 60, the position information acquisition device 70, and the vehicle-mounted camera 80. The vehicle 40 may include a four-wheeled vehicle such as an automobile. The vehicle 40 may include a two-wheeled vehicle such as a bicycle or a motorcycle, or may include a three-wheeled vehicle.

The control device 42 is communicably connected to each component mounted on the vehicle 40 via an in-vehicle network such as controller area network (CAN) or a dedicated line.

The control device 42 controls the traveling of the vehicle 40. The control device 42 may include one or more processors. The control device 42 may include one or more dedicated circuits instead of the processor, or may include one or more dedicated circuits together with the processor. The control device 42 may be configured to further include a storage unit.

The vehicle-mounted camera 80 includes, for example, a camera, an image sensor, or the like. The vehicle-mounted camera 80 captures an image of the surroundings of the vehicle 40 and outputs the image as a vehicle-mounted camera image. The vehicle-mounted camera 80 may be mounted on the vehicle 40 so as to capture an image in the traveling direction. The vehicle-mounted camera 80 may be mounted on the vehicle 40 so as to capture an image on the side. The vehicle-mounted camera 80 may be mounted on the vehicle 40 so as to capture an image of the rear. The number of the vehicle-mounted cameras 80 mounted on the vehicle 40 is not limited to one, and may be two or more.

The communication device 60 may be configured as an in-vehicle communication device. The communication device 60 may include a communication module configured to be communicable with other devices such as the server 10 via the network 30. The communication module may include a communication module conforming to mobile communication standards such as the 4G or the 5G. However, the communication module is not limited thereto.

The position information acquisition device 70 acquires the position information of the vehicle 40. The position information acquisition device 70 may be configured to include a receiver for a satellite positioning system. The receiver compatible with the satellite positioning system may include, for example, a global positioning system (GPS) receiver.

The display device 50 may include, for example, a display device that outputs visual information such as images, characters, or figures. The display device may be configured to include, for example, an LCD, an organic EL display or an inorganic EL display, a PDP, or the like. The display device is not limited to the displays above, and may be configured to include various other types of displays. The display device may be configured to include a light emitting device such as an LED or an LD. The display device may be configured to include various other devices.

The display device 50 may be included in the in-vehicle device mounted on the vehicle 40. The display device 50 may be included in, for example, a car navigation device that provides a navigation function for the vehicle 40.

The vehicle 40 may be configured to be driven by the user. The vehicle 40 may be configured to be operable by autonomous driving. The autonomous driving may be performed at any level from level 1 to level 5 defined by, for example, the Society of Automotive Engineers (SAE). The autonomous driving is not limited to the exemplified definition, and may be performed based on other definitions. When the vehicle 40 is controlled by autonomous driving, the control device 42 controls the traveling of the vehicle 40. By designating a target toward which the vehicle 40 is caused to travel, the user can cause the vehicle 40 to travel by autonomous driving to the designated target.

Operation Example of Information Processing System 1

The information processing system 1 according to the present embodiment receives an input from the user for designating a target toward which the vehicle 40 is caused to travel, and causes the vehicle 40 to travel toward the target. The information processing system 1 detects the target based on the vehicle-mounted camera image of the surroundings of the vehicle 40 captured by the vehicle-mounted camera 80 of the vehicle 40. When the vehicle 40 is driven by the driver, the information processing system 1 generates information that enables the driver to visually recognize the target, based on the detection result of the target. The information processing system 1 may generate an image in which a display emphasizing the target is superimposed on the vehicle-mounted camera image, as the information that enables the driver to visually recognize the target. When the vehicle 40 travels by autonomous driving, the information processing system 1 generates information that enables the control device 42 of the vehicle 40 to recognize the target as an image, based on the detection result of the target. The information that makes the target recognizable as an image or visually recognizable is also referred to as recognition information.

The information processing system 1 outputs the generated recognition information to the vehicle 40. When the vehicle 40 is driven by the driver, the display device 50 of the vehicle 40 displays the recognition information as an image so that the driver can visually recognize the recognition information. The driver can recognize the target by looking at the recognition information, and therefore can easily approach the target. When the vehicle 40 travels by autonomous driving, the control device 42 of the vehicle 40 recognizes the target as an image based on the recognition information and controls the traveling, so that the target can be easily approached. Hereinafter, an operation example in which the server 10 of the information processing system 1 generates the recognition information based on the vehicle-mounted camera image will be described.

Designation of Target by User

The terminal control unit 21 of the terminal device 20 receives the input from the user by the input unit 23. The user can designate a target toward which the vehicle 40 is caused to travel via the input unit 23. The terminal control unit 21 generates information related to the target designated by the user and outputs the information from the terminal communication unit 22 to the vehicle 40. The information related to the target designated by the user is also referred to as target information. The target information may include the address or name of the target designated by the user. The target information may include the latitude and longitude of the target designated by the user.

The user may designate himself/herself as the target toward which the vehicle 40 is caused to travel. The user may designate himself/herself as the target, for example, to have the vehicle 40 pick up the user. When the user himself/herself is the target, the terminal control unit 21 may output the position information of the user as the target information. The user may designate a predetermined point as the target toward which the vehicle 40 is caused to travel. The user may designate a delivery destination as the predetermined point, for example, in order to have the vehicle 40 deliver articles. For example, the user may designate a location such as the user's home or workplace as the predetermined point in order to have the vehicle 40 bring a person who provides a service to the user.

The information with which the user designates the target may include rough information such as, for example, in the vicinity of X station or in the vicinity of Y town. Further, even if the user's position information detected by the terminal device 20 possessed by the user is output as the position of the target, the accuracy of the position information may be low.

Detection of Target from Vehicle-Mounted Camera Image

The vehicle 40 travels toward the target based on the target information. The vehicle 40 captures an image of the surroundings of the vehicle 40 with the vehicle-mounted camera 80 and outputs the captured image to the server 10 as a vehicle-mounted camera image. The control unit 12 of the server 10 determines whether the target is shown in the vehicle-mounted camera image. When the target is shown in the vehicle-mounted camera image, the control unit 12 detects the target from the vehicle-mounted camera image.

When the target is the user himself/herself, the control unit 12 may acquire information related to the user via the interface 14. The information related to the user is also referred to as user information. The terminal device 20 may receive an input of the user information from the user and output the user information to the server 10. The control unit 12 may detect the target from the vehicle-mounted camera image based on the user information. The user information may include a user's face image and the like. The user information may include information representing the external form such as the height or physique of the user. The user information may include information representing various attributes such as the age group or gender of the user.

When the target is a predetermined point, the control unit 12 may acquire information related to the appearance of the predetermined point via the interface 14. The information related to the appearance of the predetermined point is also referred to as appearance information. The terminal device 20 may receive input of the appearance information from the user and output the appearance information to the server 10. The control unit 12 may acquire the appearance information from an external device. When the predetermined point is a building, the appearance information may include information representing the name of the building, a signboard, or the like.

The control unit 12 may output the vehicle-mounted camera image to the terminal device 20 via the interface 14. The terminal control unit 21 of the terminal device 20 causes the display unit 24 to display a vehicle-mounted camera image. The terminal control unit 21 receives from the user an input for specifying the target in the vehicle-mounted camera image, by the input unit 23. The terminal control unit 21 generates information for specifying the target in the vehicle-mounted camera image based on the user's input, and outputs the information to the server 10. The information for specifying the target in the vehicle-mounted camera image is also referred to as image specification information. The control unit 12 may acquire the image specification information from the terminal device 20 and detect the target from the vehicle-mounted camera image based on the image specification information.

When the user cannot find the target in the vehicle-mounted camera image, the terminal control unit 21 may receive an input from the user indicating that the target cannot be specified.

When the target cannot be detected from the vehicle-mounted camera image, the control unit 12 may cause the vehicle 40 to travel so that the vehicle 40 further approaches the target. The control unit 12 may cause the vehicle 40 to travel around a position where the target is presumed to exist until the target can be detected from the vehicle-mounted camera image.

Generation of Recognition Information

Figure 2:
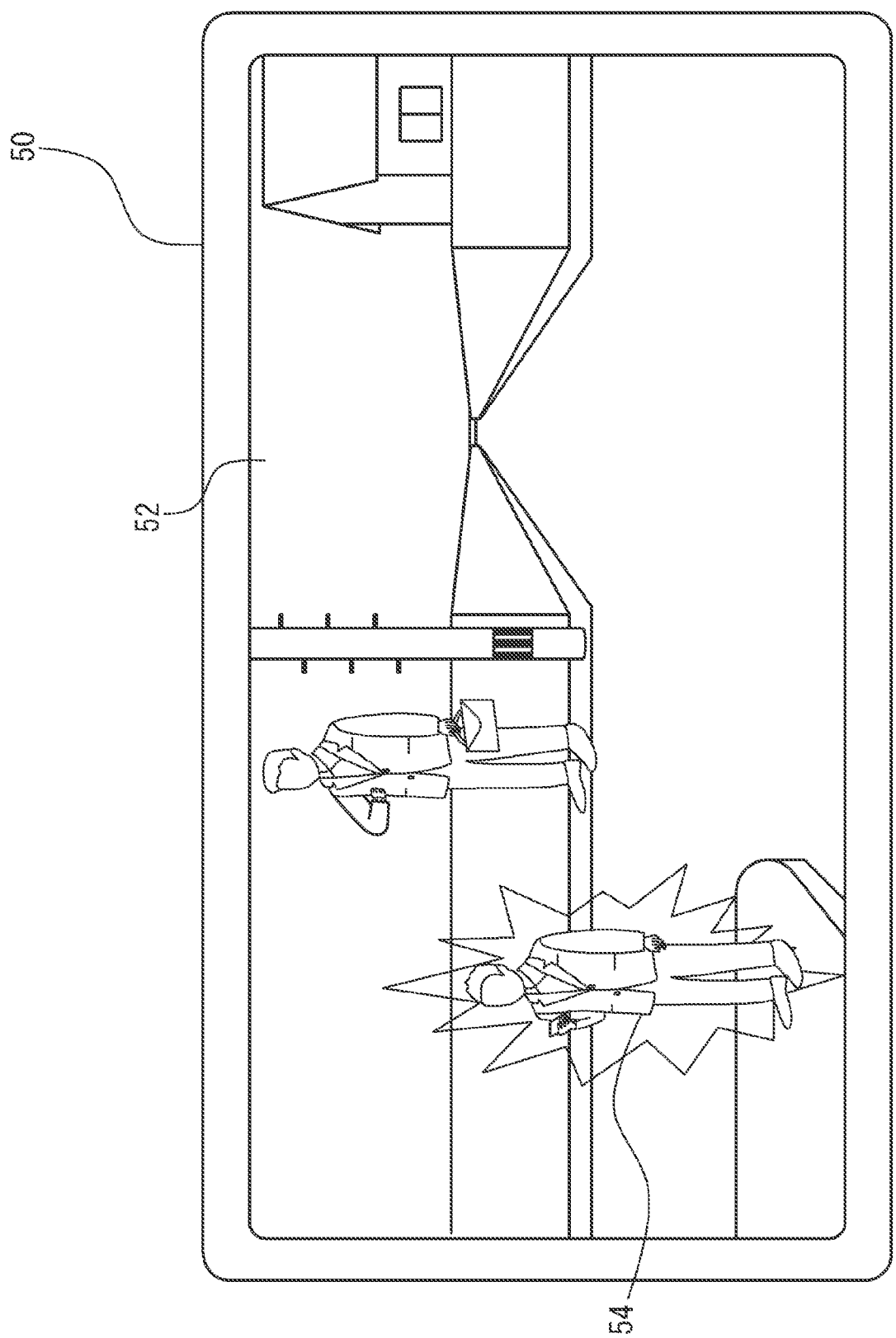
FIG. 2 is a diagram showing an example of a display device that displays a recognition image as recognition information.

The control unit 12 generates the recognition information based on the detection result of the target from the vehicle-mounted camera image. When the vehicle 40 is driven by the driver, the control unit 12 generates the recognition information so that the driver can visually recognize the target. For example, as shown in FIG. 2, the control unit 12 may generate a recognition image 52 in which a display emphasizing a target is superimposed on the vehicle-mounted camera image as the recognition information, and output the recognition image 52 to the vehicle 40 to cause the display device 50 to display the recognition image 52. In FIG. 2, a target user 54, which is the target toward which the vehicle 40 travels, is included in the recognition image 52. The display emphasizing the target may include a display that surrounds the target user 54 with a predetermined figure, as illustrated in FIG. 2. The display emphasizing the target may include various displays such as a display that emphasizes the outline of the target user 54 with a conspicuous color such as red, a display that colors the target user 54 himself/herself with a conspicuous color, and a display that adds a figure such as an arrow pointing to the face of the target user 54. The display emphasizing the target may include various displays that enable the target user 54 to be distinguished from another person in the vehicle-mounted camera image.

In order to emphasize the target user 54, the control unit 12 may generate an enlarged image of the target user 54 as the recognition information, or may generate an image in which the target user 54 is located at the center as the recognition information.

When the target is a predetermined point, the display emphasizing the target may include a figure such as an arrow pointing to the predetermined point. The display emphasizing the target may include a display in which a structure such as a building, a signboard, or a sign corresponding to the predetermined point is surrounded by a predetermined figure. The display emphasizing the target may include a display that colors the outline of the structure corresponding to the predetermined point or the structure itself. The display emphasizing the target may include various displays that enable the structure corresponding to the predetermined point to be distinguished from other structures shown in the vehicle-mounted camera image.

When the vehicle 40 travels by autonomous driving, the control unit 12 generates the recognition information so that the control device 42 recognizes the target as an image and can control the traveling of the vehicle 40. The control unit 12 may generate an image of the target itself as the recognition information. The control unit 12 may extract an image of the target itself from the vehicle-mounted camera image. The control unit 12 may generate information for specifying the coordinates in which the target is captured in the vehicle-mounted camera image as the recognition information.

Traveling of Vehicle 40 Based on Recognition Information

The control unit 12 outputs the recognition information to the vehicle 40. When the vehicle 40 is driven by the driver, the recognition information is displayed on the display device 50 so that the driver can visually recognize the recognition information. The driver confirms the target by the recognition information and causes the vehicle 40 to travel toward the target. When the vehicle 40 travels by autonomous driving by the control device 42, the control device 42 recognizes the target based on the recognition information and the vehicle-mounted camera image, and causes the vehicle 40 to travel toward the target. The vehicle 40 can easily approach the target by traveling based on the recognition information.

Procedure Example of Information Processing Method

Figure 3:
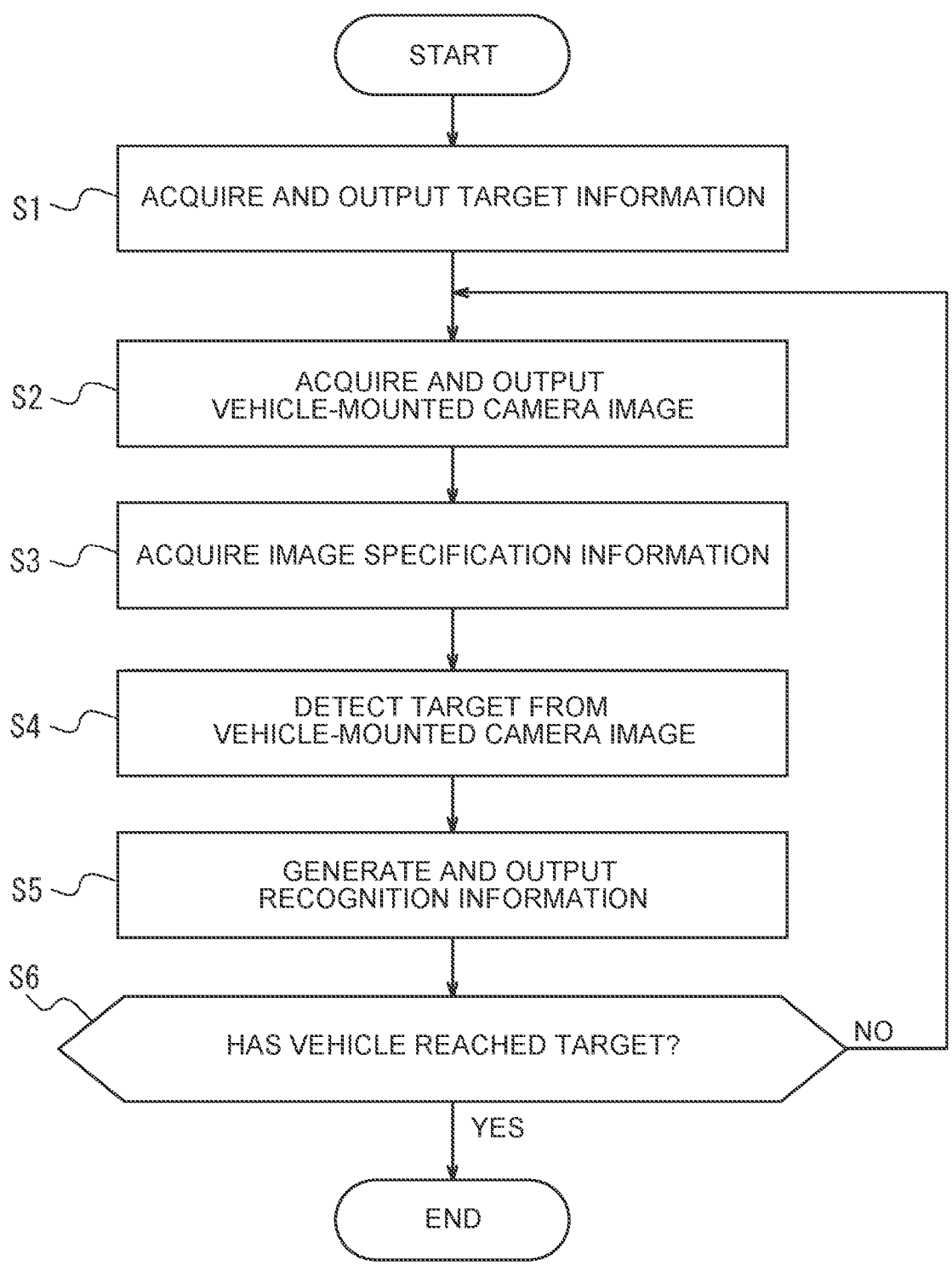
FIG. 3 is a flowchart showing a procedure example of an information processing method according to the embodiment.

As described above, the information processing system 1 according to the present embodiment generates the recognition information so that the vehicle 40 can easily approach the target. The control unit 12 may execute an information processing method including the procedure of a flowchart illustrated in FIG. 3, for example. The information processing method may be realized as an information processing program to be executed by the control unit 12. The information processing program can be stored in a non-transitory computer-readable medium.

The terminal device 20 receives an input from the user for designating a target toward which the vehicle 40 is caused to travel, generates the target information, and outputs the target information to the server 10. The server 10 acquires the target information from the terminal device 20. The server 10 outputs the target information to the vehicle 40 (step S1).

The vehicle 40 outputs a vehicle-mounted camera image to the server 10 while traveling toward the target based on the target information acquired from the server 10. The server 10 acquires the vehicle-mounted camera image from the vehicle 40. The server 10 outputs the vehicle-mounted camera image to the terminal device 20 (step S2).

The terminal device 20 receives from the user an input for specifying a target in the vehicle-mounted camera image acquired from the server 10, generates the image specification information, and outputs the image specification information to the server 10. The server 10 acquires the image specification information from the terminal device 20 (step S3).

The server 10 detects the target from the vehicle-mounted camera image based on the vehicle-mounted camera image acquired from the vehicle 40 or the image specification information acquired from the terminal device 20 (step S4). The server 10 generates the recognition information based on the detection result of the target and outputs the recognition information to the vehicle 40 (step S5).

The vehicle 40 travels toward the target based on the recognition information, and notifies the server 10 whether the target has been reached. The server 10 acquires the notification from the vehicle 40 and determines whether the vehicle 40 has reached the target (step S6). When the vehicle 40 has reached the target (step S6: YES), the server 10 ends the execution of the procedure shown in the flowchart of FIG. 3. When the vehicle 40 has not reached the target (step S6: NO), the server 10 may repeat the steps S2 to S5 to generate the recognition information. The server 10 may repeat the determination procedure in step S6 until the notification that the target has been reached is acquired from the vehicle 40.

SUMMARY

As described above, the information processing system 1 according to the present embodiment can output the recognition information to the vehicle 40 traveling toward the target, and can cause the vehicle 40 to travel based on the recognition information. In this way, the vehicle 40 can easily reach the target.

Other Embodiments

Hereinafter, a configuration example of the information processing system 1 according to another embodiment will be described.

Detection of Target Hidden Behind Other Objects in Vehicle-Mounted Camera Image

There are cases where, although the target exists within the angle of view of the vehicle-mounted camera image, the target is hidden behind other objects and not shown in the vehicle-mounted camera image. When the terminal device 20 receives an input for specifying the target in the vehicle-mounted camera image, the user may estimate the position of the target hidden behind another object and specify the position in the vehicle-mounted camera image. The terminal control unit 21 may generate information for specifying an object hiding the target as the image specification information and output the image specification information to the server 10.

The control unit 12 of the server 10 may detect the position of the target existing in the vehicle-mounted camera image based on the information specifying the object hiding the target. Based on the detection result of the position of the target in the vehicle-mounted camera image, the control unit 12 may generate information indicating which object the target is hidden behind as the recognition information and output the recognition information to the vehicle 40. In this way, the possibility that the control unit 12 can detect the target and generate the recognition information increases.

Specification of Target Based on Candidate Image

The control unit 12 may analyze the vehicle-mounted camera image based on the information related to the user and detect whether the user is shown in the vehicle-mounted camera image. Further, the control unit 12 may extract an image presumed to be a user's image from the vehicle-mounted camera image as a user candidate image and output the user candidate image to the terminal device 20. The terminal control unit 21 of the terminal device 20 causes the display unit 24 to display the user candidate image, and the input unit 23 receives an input causing the user to confirm whether the user candidate image is the user's image. The terminal control unit 21 outputs the confirmation result of the user to the server 10. When the user candidate image is the user's image, the control unit 12 detects the user as the target based on the user candidate image. In this way, the accuracy with which the control unit 12 detects the target can be improved.

Capturing Vehicle-Mounted Camera Image

The vehicle 40 may acquire the position information of the target from the server 10 as the target information. The vehicle 40 may calculate the direction in which the target is located based on the position information of the target and the position information of the vehicle 40 itself. The vehicle-mounted camera 80 of the vehicle 40 may capture a vehicle-mounted camera image including the calculated direction in the angle of view, and output the vehicle-mounted camera image to the server 10. The control unit 12 of the server 10 detects the target based on the vehicle-mounted camera image captured based on the position information of the target. In this way, the possibility that the target is shown in the vehicle-mounted camera image increases. As a result, the control unit 12 can easily detect the target from the vehicle-mounted camera image. Further, since a vehicle-mounted camera image that is not used for detecting the target is not output, the communication load of the information processing system 1 or the operation load of each component can be reduced.

Timing of Detection Start of Target

When the vehicle 40 is far from the target, it is unlikely that the target is shown in the vehicle-mounted camera image. The control unit 12 of the server 10 may determine whether the vehicle 40 has approached the target within a predetermined distance based on the position information of the vehicle 40 and the position information of the target. When the vehicle 40 has approached the target within a predetermined distance, the control unit 12 may start detecting the target based on the vehicle-mounted camera image. In this way, the possibility that the target is shown in the vehicle-mounted camera image increases. As a result, the control unit 12 can easily detect the target from the vehicle-mounted camera image. Further, since a vehicle-mounted camera image that is unlikely to show the target is not output, the communication load of the information processing system 1 or the operation load of each component can be reduced.

Mode where Server 10 is Mounted on Vehicle 40

The function of the server 10 may be realized by the control device 42 mounted on the vehicle 40. When the control device 42 realizes the function of the server 10, the control device 42 may detect the target based on the vehicle-mounted camera image and cause the display device 50 to display an image in which the target is emphasized. The control device 42 may detect the target based on the vehicle-mounted camera image and cause the vehicle 40 to travel by autonomous driving so that the vehicle 40 approaches the detected target.

Although the embodiments according to the present disclosure have been described above based on the drawings and examples, it should be noted that those skilled in the art can make various modifications and alterations thereto based on the present disclosure. It should be noted, therefore, that these modifications and alterations are within the scope of the present disclosure. For example, the functions included in each means, each step, or the like can be rearranged so as not to be logically inconsistent, and a plurality of means, steps, or the like can be combined into one or divided.

What is claimed is:

1. An information processing device comprising:
    an interface that acquires a vehicle-mounted camera image from a vehicle traveling toward a target designated by a user; and
    a control unit that detects the target based on the vehicle-mounted camera image, generates recognition information that makes the target recognizable as an image or visually recognizable based on a detection result of the target, and outputs the recognition information to the vehicle.

2. The information processing device according to claim 1, wherein when the vehicle travels with the user as the target, the control unit detects the user as the target from the vehicle-mounted camera image.

3. The information processing device according to claim 2, wherein:
    the interface acquires information related to the user; and
    the control unit detects the user as the target from the vehicle-mounted camera image based on the information related to the user.

4. The information processing device according to claim 3, wherein:
    the control unit extracts an image presumed to be an image of the user from the vehicle-mounted camera image as a user candidate image, based on the information related to the user;
    the interface outputs the user candidate image to a terminal device of the user and acquires information causing the user to confirm whether the user candidate image is the image of the user; and
    when the user confirms that the user candidate image is the image of the user, the control unit detects the user shown in the user candidate image as the target.

5. The information processing device according to claim 2, wherein:
    the interface
        outputs the vehicle-mounted camera image to a terminal device of the user, and
        acquires, from the terminal device of the user, image specification information for specifying the user in the vehicle-mounted camera image; and
    the control unit detects the user as the target based on the image specification information.

6. The information processing device according to claim 5, wherein when the user is hidden behind another object and is not shown in the vehicle-mounted camera image, the interface acquires information for specifying the object hiding the user as the image specification information.

7. The information processing device according to claim 5, wherein:
    the control unit extracts an image presumed to be an image of the user from the vehicle-mounted camera image as a user candidate image, based on information related to the user;
    the interface outputs the user candidate image to the terminal device of the user and acquires information causing the user to confirm whether the user candidate image is the image of the user; and
    when the user confirms that the user candidate image is the image of the user, the control unit detects the user shown in the user candidate image as the target.

8. The information processing device according to claim 1, wherein when the vehicle travels with a predetermined point designated by the user as the target, the control unit detects the predetermined point as the target.

9. The information processing device according to claim 8, wherein:
    the interface outputs the vehicle-mounted camera image to a terminal device of the user and acquires, from the terminal device of the user, image specification information for specifying the predetermined point in the vehicle-mounted camera image; and
    the control unit detects the predetermined point as the target based on the image specification information.

10. The information processing device according to claim 9, wherein when the predetermined point is hidden behind another object and is not shown in the vehicle-mounted camera image, the interface acquires information for specifying the object hiding the predetermined point as the image specification information.

11. The information processing device according to claim 1, wherein the interface outputs position information of the target to the vehicle and acquires, from the vehicle, the vehicle-mounted camera image captured by the vehicle based on the position information of the target.

12. The information processing device according to claim 1, wherein the control unit starts detecting the target based on the vehicle-mounted camera image when the vehicle approaches the target within a predetermined distance.

13. The information processing device according to claim 1, wherein the control unit generates a recognition image in which a display emphasizing the target is superimposed on the vehicle-mounted camera image, and outputs the recognition image to the vehicle as the recognition information.

14. An information processing system including the information processing device according to claim 1, a terminal device possessed by the user, and the vehicle.

15. An information processing method comprising:
    acquiring a vehicle-mounted camera image from a vehicle traveling toward a target designated by a user;
    detecting the target based on the vehicle-mounted camera image;
    generating recognition information that makes the target recognizable as an image or visually recognizable based on a detection result of the target; and
    outputting the recognition information to the vehicle.

16. The information processing method according to claim 15, further comprising:

outputting the vehicle-mounted camera image to a terminal device of the user;

acquiring, from the terminal device of the user, image specification information for specifying the target in the vehicle-mounted camera image; and detecting the target from the vehicle-mounted camera image based on the image specification information.

17. The information processing method according to claim 16, further comprising acquiring, when the target is hidden behind another object and is not shown in the vehicle-mounted camera image, information for specifying the object hiding the target as the image specification information.

18. The information processing method according to claim 15, further comprising generating a recognition image in which a display emphasizing the target is superimposed on the vehicle-mounted camera image, and outputting the recognition image to the vehicle as the recognition information.

19. A terminal device possessed by a user, the terminal device comprising:
a terminal communication unit that acquires a vehicle-mounted camera image captured by a vehicle traveling toward a target;
a display unit that displays the vehicle-mounted camera image;
an input unit that receives an input from the user; and
a terminal control unit, wherein:
the input unit receives an input for specifying the target in the vehicle-mounted camera image by the user; and
the terminal control unit
generates image specification information for specifying the target in the vehicle-mounted camera image, based on the input for specifying the target, and
outputs the image specification information from the terminal communication unit to an information processing device that detects the target from the vehicle-mounted camera image to generate recognition information that makes the target recognizable as an image or visually recognizable, and that outputs the recognition information to the vehicle.

20. The terminal device according to claim 19, wherein:
the input unit receives an input of information related to the user; and
the terminal communication unit outputs the information related to the user to the information processing device such that the information processing device detects the user from the vehicle-mounted camera image as the target based on the information related to the user.

21. The terminal device according to claim 19, wherein:
the terminal communication unit acquires, from the information processing device, an image presumed to be an image of the user as a user candidate image;
the input unit receives an input for the user to confirm that the user candidate image is the image of the user; and
the terminal control unit outputs, to the information processing device, information indicating that the user has confirmed that the user candidate image is the image of the user, such that the information processing device detects the user shown in the user candidate image as the target.

* * * * *